United States Patent [19]
Kim

[11] Patent Number: 5,883,474
[45] Date of Patent: Mar. 16, 1999

[54] STROBE DIMMER OF WHICH THE LUMINOUS INTENSITY AND COLOR TEMPERATURE ARE CONTROLLABLE

[76] Inventor: Joung Boo Kim, 1105 Hyundai Apt., 175-4, Jongro-3 ga, Jongro-ku, Seoul, Rep. of Korea

[21] Appl. No.: 733,923

[22] Filed: Oct. 18, 1996

[30] Foreign Application Priority Data

Oct. 21, 1995 [KR] Rep. of Korea .................. 1995-36505

[51] Int. Cl.$^6$ ............................ H05B 41/38; H05B 41/00
[52] U.S. Cl. ................................ 315/241 S; 315/DIG. 4; 396/164; 396/225
[58] Field of Search .......................... 315/DIG. 4, 241 P, 315/241 S, 291, 200 A; 396/155, 164, 166, 167, 225; 348/223, 224, 225

[56] References Cited

U.S. PATENT DOCUMENTS 3,783,338  1/1974  Bowen .................................... 315/240

*Primary Examiner*—Steven Mottola
*Assistant Examiner*—Arnold Kinkead

*Attorney, Agent, or Firm*—Finnegan, Henderson, Farabow, Garrett & Dunner

[57] ABSTRACT

A strobe dimmer of which the luminous intensity and color temperature are respectively controllable comprises: a fourfold-voltage rectifier circuit(1) having two twofold-voltage rectifier circuits(11,12) for rectifying an input voltage to twofold or fourfold DC voltage depending on the magnitude of input voltage and applying the rectified input voltage to respective strobe discharge tubes(ST1,ST2,ST3); a high voltage generating circuit(5) for supplying high voltage to respective trigger terminals(Tr) of the strobe discharge tubes(ST1,ST2,ST3) through corresponding trigger coils(LT); a first luminous intensity control circuit(13) connected between a ground terminal(GND) and an output terminal(X) of the fourfold rectifier circuit(1), and connected to respective anode terminals(Ad) of the strobe discharge tubes(ST1,ST3); a second luminous intensity control circuit(13a) connected between the ground terminal (GND) and the output terminal(X) of the fourfold rectifier circuit(1), and connected to respective anode terminals(Ad) of the strobe discharge tubes(ST2,ST3); and a color temperature control unit(14) connected to a terminal of a power supply.

6 Claims, 2 Drawing Sheets

FIG. I
PRIOR ART

STROBE DIMMER OF WHICH THE LUMINOUS INTENSITY AND COLOR TEMPERATURE ARE CONTROLLABLE

FIELD OF THE INVENTION

This invention relates to a strobe dimmer of which the luminous intensity and color temperature required for photographing are accurately controllable in many stages.

BACKGROUND OF THE INVENTION

Generally it requires a strobe dimmer having variable luminous intensity and color temperature to take a good photo.

Presently, several strobe dimmers are known for obtaining variable luminous intensity and color temperature.

For example, the patent KR-29301 filed Jul. 30,1986, by the same applicant discloses a strobe dimmer as shown in FIG. 1. According to this document, strobe discharge tube (ST1,ST2) are connected through respective connector. A fourfold-voltage rectifier circuit (1) in a charger and discharger connected to the other side of the connector, consists of two double-voltage rectifier(11,12) so to output double or fourfold rectified voltage depending on applied power(AC). The fourfold-voltage rectifier circuit(1) rectifies input voltage to fourfold DC voltage and then offers respective outputs to output terminals(X,Y), wherein the outputs are 620 V DC and 310 V DC respectively when the power supply is 110 V. On the other hand, in the case of 220 V, said rectifier circuit(11) just rectifies the input voltage to double DC voltage and then offers same output(i.e., 620 V DC and 310 V DC) to the terminals(X,Y) thereof respectively.

The power supply(AC) is applied to the fourfold-voltage rectifier(1) through a resistor(R2) and a terminal(B), and also applied to a third relay(RY3) through a resistor(R3) and a diode(D1) of a 110 V/220 V automatic switching circuit (3), when 110 V power supply is applied by turn on a power supply switch(SW1). Since the third relay(RY3) is operated by 220 V-power supply, when 110 V power supply is applied to a third relay(RY3), a relay switch turns off to block the current to a gate of a triac(TC2). Therefore, the triac(TC2) is cut off and a fourth relay(RY4) may not operate, so that a terminal(b) in the relay switch of the fourth relay is connected to a terminal(c) and a terminal(e) is connected to a terminal(f) respectively. Furthermore, 110 V AC power is supplied to the primary intermediate tap of transformer(T1) through the respective relay switches(e,f) of the fourth relay(RY4) to apply increased AC voltage on the secondary of the transformer.

Since the increased AC voltage is applied to the well-known high voltage generating circuit(5) for trigger voltage, a terminal(S) of the high voltage generating circuit(5) outputs high voltage. AC power applied between the terminal (B) and a ground terminal of the fourfold rectifier circuit(1) is rectified to fourfold voltage in the usual manner. Since the fourth relay(RY4) of 110 V/220 V automatic switching circuit(3) is connected to the relay switch terminals(b,c) of said fourth relay switch(RY4) in non-operating state, the double-voltage rectifier circuit(11) is connected to the other double-voltage rectifier circuit(12) through the relay switch terminal(b,c) to rectify to fourfold voltage.

Accordingly, 110 V power supply is rectified to fourfold 620 V DC voltage and then output from a terminal(X) when an internal capacitor(not shown) in the fourfold-voltage rectifier circuit(1) is fully charged with fourfold DC voltage rectified from said AC input voltage. Said fourfold DC voltage is then applied to an anode terminal(Ad) while a terminal(Y) of the fourfold-voltage rectifier circuit(1) outputs 310 V DC voltage, equal to a half of the fourfold voltage output, which will be applied to a resistor(R1) of a relay driving circuit(2). The resistor(R1) is selected to make a zener diode(ZD1) become conductive when the terminal (Y) of a common fourfold-rectifier circuit(1) outputs 310 V (i.e., after passing through the resistor(R1), 286 V is applied to the ZD1 to make it conductive when the breakdown voltage of the ZD1 is 24 V).

Therefore, the first relay(RY1) is actuated since it experiences a difference of voltage, which is different from the 110 V AC input, between contact(U) and contact(P) on that power supply(AC) is applied. As the relay(RY1) operates to turn on a relay switch thereof, power supply (AC) is applied to a gate of triac (TC1) through a resistor(R5) for trigger voltage so tnat the arxidc(TC1) becomes conductive.

110 V AC applied on the anode of triac(TC1) subsequently flows to a cathode and is then applied on the coil of the second relay(RY2). The second relay(RY2) is operated to connect a relay switch terminal(b) and a terminal(c), and to connect a terminal(e) and terminal(f) respectively, so that an output of the trigger coil(LT) is connected to a terminal (Tr) of the strobe discharge tube(ST1,ST2). The first relay (RY1) can not operate since the zener diode(ZD1) of the relay driving circuit(2) turns off when the voltage offered from the terminal(X,Y) of the well-known fourfold-voltage rectifier circuit(1) is lower than the predetermined voltage because of insufficient charge of the internal capacitor. Accordingly, the triac(TC1) also turns off and results in stoppage of the second relay(RY2), so that the relay switch terminal(a) and the terminal(b), and the terminal(d) and the terminal(e) are respectively connected. Furthermore, the output of the trigger coil(LT) is not connected to the discharge tube(ST1,ST2) while an alarm(AM) makes a sound or illuminates to indicate an insufficient charge in accordance with the formation of a ground path of the power supply applied to the alarm through the capacitor(C4). On the contrary, once the shutter is pressed down to turn on a shutter switch(SW2) of a camera, high voltage offered from the terminal(S) of the high voltage generating circuit (5) for producing typical trigger voltage, is applied to the trigger coil(LT) through the shutter switch(SW2) when the fourfold-voltage rectifier circuit(1) is fully charged and then outputs normal DC(i.e., the terminal(e)and the terminal(f) of the second relay(RY2), and the terminal(b) and the terminal (f) are respectively connected). Trigger voltage generated from the trigger coil(LT) is applied on the trigger terminal (Tr) of the strobe discharge tube(ST1,ST2) through the relay switch terminal(e.f) of the second relay(RY2) while the cathode terminal(Cd) of the strobe discharge tube(ST1,ST2) is provided with a ground point through the relay switch terminals(b,C), so that the strobe discharge tube discharges to radiate the light having suitable luminous intensity to take a photo.

In the case of 220 V power supply input, a 220 V relay(RY3) of the 110/220 V automatic switching circuit(3) is operated to turn on the relay switch. As the triac(TC2) becomes conductive depending on the current that flows to the gate of the triac by the power supply(AC) through the resistor(R4), the fourth relay(RY4) starts to operate. Consequently, as the relay switch terminal(a) and the terminal(b), and the terminal(d) and the terminal(e) are respectively connected, the 220 V power supply(AC) is applied to the primary end terminal of transformer(T1) through the terminals(d,e), so that voltage on the secondary of transformer(T1) is similar to the above case that the power supply is 110 V. Furthermore, in the well-known fourfold-voltage rectifier circuit(1), since the relay switch terminals(a,b) are connected, the double-voltage rectifier circuit(11) and the other double-voltage rectifier circuit(12) are spaced apart from each other. The 220 V power supply applied to the terminals(A,B) is rectified to double voltage through only one double-voltage rectifier circuit(11) and then 620 V output is offered to the terminal(X). Accordingly, it is operated in similar with the case of 110 V power supply because the voltage offered from the respective terminals (X,Y) are 620 V DC and 310 V DC respectively.

The capacitor(C2) arranged in the input of the power supply(AC) prevents spark that can be produced by on/off operation of power switch(SW1).

The optical sensor(4) aims to increase luminous intensity by radiation of the discharge tubes(ST1,ST2) when the another strobe discharge tube, separated from the present invention, is emitted, in other word, the photo-transistor(PT) is turn on by light radiated from the strobe discharge tube, and high voltage offered from the terminal of the high voltage generating circuit(S) is then reduced through a resistor(Rx) having several mega-ω when another strobe discharge tube starts to discharge by turning on the switch.

Thereafter, the reduced voltage is applied to the gate of the triac(TC3) through the switch(SW3), a collector of the photo-transistor, and an emitter(wherein, a high resistor is used as the resistor(Rx) to protect the photo-transistor(PT)). In accordance with this, the triac(TC3) becomes conductive and then high voltage generated from the terminal(S) of a well-known high voltage generating circuit(5) is applied to the trigger coil(LT) through the triac(TC3) so that the applied trigger voltage make the strobe discharge tubes(ST1, ST2) discharge in the same manner with the shutter switch (SW2) pressed down. Since this instantaneous operation is activated by light, as soon as another strobe discharge tube starts to discharge, the luminous intensity of light is increased as much as the amount of the additional discharge.

It is necessary to separate the strobe discharge tube(ST1, ST2) from the connector. It is achieved by turning off the switch(SW1) at first, and then stopping the second relay (RY2) from emitting the spark when the discharge tubes (ST1,ST2) become connected or disconnected.

In addition, when the strobe discharge tubes (ST1,ST2) are not radiated in practice through they should be activated by photoflash of another separated strobe discharge tube in outside, i.e., when the strobe discharge tubes(ST1,ST2) are not discharged in sequence, the alarm(AM) does not operate to make a sound and/or light since the contacts of the second relay(RY2) are maintained in the state of (b,c) and (e,f). Consequently, user may know whether the strobes are operated in sequence or not, so that it is possible to re-take a photo when it fails to photograph an object.

The conventional strobe dimmer using a constant-voltage may not ensure good photographing since the color temperature is too high or too low according to the voltage, i.e., when the conventional strobe is adapted to a main light and/or an auxiliary light, the color temperature of the strobe is changed in accordance with the voltage. Wherein, the color temperature is set on the basis of the sun of which the color temperature is 5500° K. This means that fire of 5500° K radiates the same color as the sun. Accordingly, as most film manufacturers make film to present the best color under daylight, 5500° K color temperature is the most preferable to take a photo.

A tungsten lamp can be used as a main light or an auxiliary light according to voltage, i.e., in the case of high voltage, the lamp becomes more bright(colored blue) and is therefore suitable for the main light. while in the case of low voltage, the lamp becomes relatively dark(colored red) so as to be suitable for the auxiliary light. However, an object presents contrasts of light and shade according to the brightness of the lamp, so that it is not preferable to take a good photo, because of dark part colored red.

For example, when two 600 W/s strobe discharge tubes are respectively used as a main light and an auxiliary light for portrait, the main light is set in 600 W/s and the auxiliary light in 200 W/s. The main light is 5800° K and the auxiliary light is 5400° K, while pure white light is 5500° K, so that a part toward the main light is tinted with blue and the other part toward the auxiliary light is tinted with red. This results from the relative high color temperature of the main light so to radiate blue light and the relatively low color temperature of the auxiliary light so as to radiate red light. Consequently, the portrait presents blue color in one check and simultaneously red color in the other check so that it is hard to control the color balance during developing.

If the red color toward the main light is corrected, the other part toward the auxiliary light is tinted with red still more, and the reverse case has a similar drawback, so that it should be developed in in-between tone.

Thereafter, in the conventional lights using simple constant voltage unit, color temperature becomes too high or too low depending on voltage. A right strobe, a left strobe and another strobe(main light, auxiliary light, front light, top light, and spot light, etc.) have different color temperatures respectively so this not ensure good photographing.

Although it is preferable for a general commercial photo to use 5500° K color temperature, 5000° K~5300° K color temperature is preferable for a mild image of portrait. A gold coated strobe, which is emitting red color, has been used for a preferable portrait to eliminate blue color radiated from a xenon lamp up to the present. It is necessary to execute a complicated operation to adjust a color temperature by control of the luminous intensity.

Alternatively, since the color temperature is increased or decreased depending on the apparatus that is used for indirect lighting, it is hard to obtain the desired color temperature for photography when a reflector or a light filtering soft-box is used to avoid direct lighting of the strobe. Hence, It is necessary to use a filter determined by MIRED(Micro Reciprocal Degree) calculation measuring the different color temperature of the strobe.

Furthermore, in order to photograph a dark part and a bright part of an object with the same the color temperature, it is necessary to illuminate the dark part from far away, which is quite complicated.

SUMMARY OF THE INVENTION

It is an object of the present invention to provide a strobe dimmer of which the luminous intensity and the color temperature are simultaneously controllable in many stages so that a portrait or a commercial photo may be taken with the same set of strobes. Furthermore, according to the present invention, it is possible to decrease the luminous intensity without an additional long-distance light.

The present invention provides a strobe dimmer of which the luminous intensity and color temperature are respectively controllable and comprises a fourfold-voltage rectifier circuit(1) having two twofold-voltage rectifier circuits(11, 12) for rectifying an input voltage to twofold or fourfold DC voltage depending on the magnitude of the input voltage and applying the rectified input voltage to respective strobe discharge tubes(ST1,ST2,ST3); a high voltage generating circuit(5) to offer high voltage to respective trigger terminals (Tr) of the strobe discharge tubes(ST1,ST2,ST3) through corresponding trigger coils(LT); a first luminous intensity control circuit(13) connected between a ground terminal (GND) and an output terminal(X) of the fourfold rectifier circuit(1), and connected to respective anode terminals(Ad) of the strobe discharge tubes(ST1,ST2); a second luminous intensity control(13a) connected between the ground terminal(GND) and the output terminal(X) of the fourfold rectifier circuit(1), and connected to respective anode terminals(Ad) of the strobe discharge tubes(ST2,ST3); and a color temperature control unit(14) having an end connected to a terminal of a power supply.

Furthermore, the present invention provides a strobe dimmer of which the luminous intensity and color temperature are respectively controllable and comprises: a fourfold-voltage rectifier circuit(1) having two twofold-voltage rectifier circuits(11,12), for rectifying an input voltage to twofold or fourfold DC voltage depending on the magnitude of the input voltage and applying the rectified input voltage to respective strobe discharge tubes(ST1,ST2,ST3); a high voltage generating circuit(5) to offer high voltage to respective trigger terminals(Tr) of the strobe discharge tubes(ST1, ST2,ST3) through corresponding trigger coil(LT); a first luminous intensity control circuit(13) connected between a ground terminal(GND) and an output terminal(X) of the fourfold rectifier circuit(1), and connected to respective anode terminals(Ad) of the strobe discharge tubes(ST1, ST2); a second luminous intensity control circuit(13a) connected between the ground terminal (GND) and the output terminal(X) of the fourfold rectifier circuit(1), and connected to respective anode terminal(Ad) of the strobe discharge tubes(ST2,ST3); a color temperature control unit(14) having an end connected to a terminal of a power supply; and a modeling lamp unit(16) indicating the intensity of illumination of the strobe discharge tubes(ST1,ST2,ST3) prior to taking a photo.

As described above, the luminous intensity and/or the color temperature of the present strobe dimmer may be controlled in many steps by selection of the respective relay switches of the first and the second control circuits to change the charging capacitance and applied DC voltage of the strobe discharge tube. It is also possible to see the intensity of illumination of the strobe discharge tubes prior to photography through the corresponding tungsten modeling lamps by selection of the respective relay switches.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE EMBODIMENT

Figure 1:
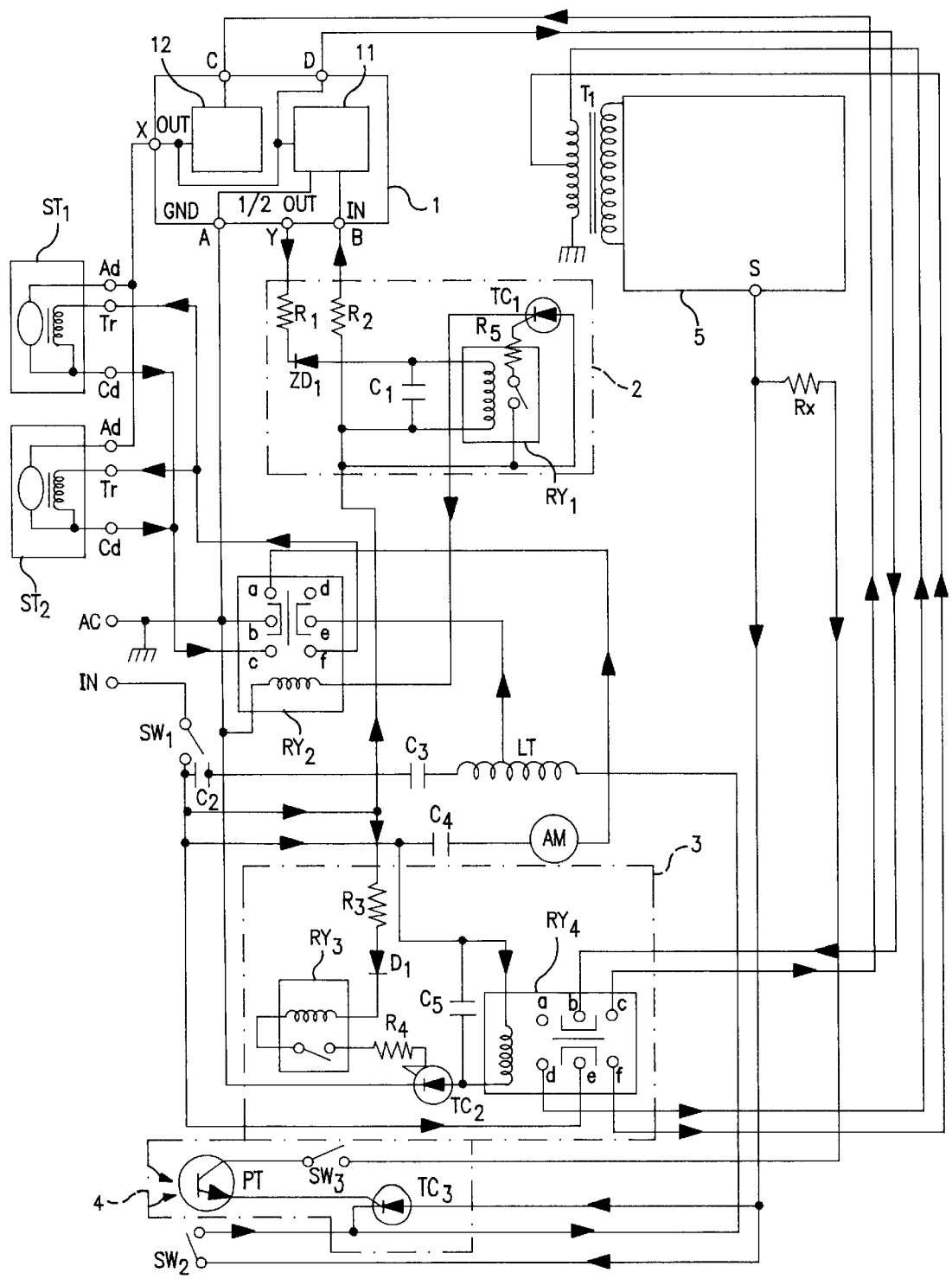
FIG. 1 shows a circuit for a conventional 100 V/220 V automatic strobe dimmer.
Figure 2:
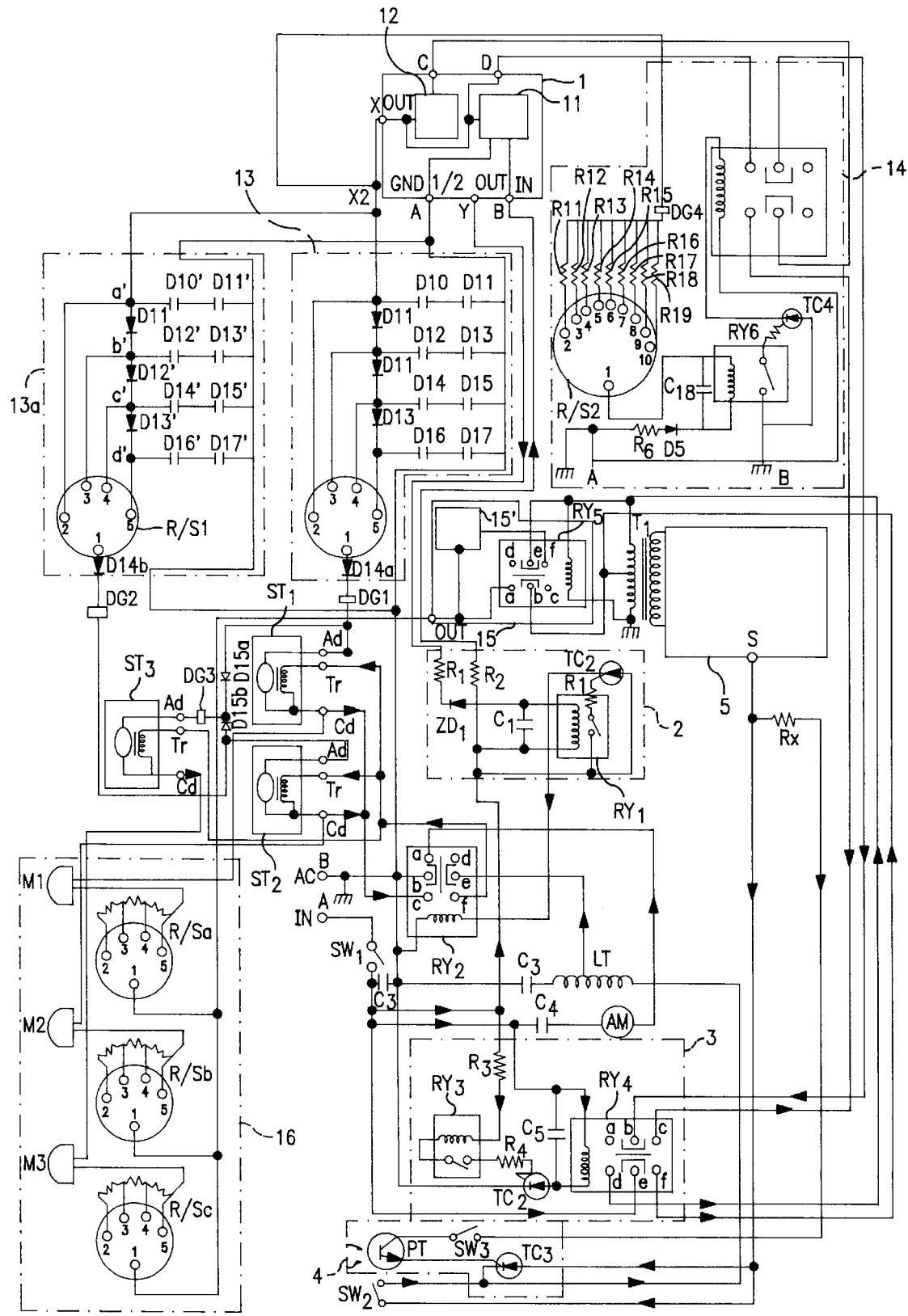
FIG. 2 shows a circuit for strobe dimmer of the present invention.

FIG. 2 show a circuit of an embodiment of the present strobe dimmer. According to the drawing, the circuit consists of the first and the second luminous intensity control circuit (13,13a) on the output of the fourfold-voltage rectifier circuit(1), the color control unit(14) to control the color temperature of light, and the modeling lamps(M1,M2,M3) to see the intensity of illumination. The other elements similar to the circuit shown in the FIG. 1 are omitted.

The first and the second control circuits(13,13a) are operated as follows.

In the case of 110 V input, fourfold rectified DC voltage outputs from the output terminal(X;in the case of 220 V input, double rectified DC voltage is output from the double-voltage rectifier circuit(11)) of the fourfold-voltage rectifier circuit(1) and then the output DC voltage is applied to a node(ⓐ) of the first control circuit(13) by connection of a connector(not shown). In this case, since the same voltage as the fourfold rectified DC voltage is applied to the anode terminal(Ad) of the strobe discharge tube(ST1), the color temperature of the strobe discharge tube(ST1) can be maintained at 5500° K when a contact(①) and the contact(②) of the rotary switch(R/S) are connected by selection of the rotary switch(R/S) are connected, so that it is possible to photograph with pure white light. The diode prevents reverse-voltage, and the luminous intensity of the strobe discharge tube is displayed on the digital display (DG1).

As discribed above when the contact(①) and the contact(②) of the rotary switch(R/S) are connected by selection of the rotary switch(R/S), charging capacitance of the first control circuit(13) at the node(ⓐ) is determined by compound capacitance of capacitors(C10,C11) connected in series, so that it is possible to photograph with a desired tone by discharging of the strobe discharge tube.

Alternatively, applied voltage to the anode terminal(Ad) of the strobe discharge tube(ST1) is the same as the said fourfold rectified DC voltage when the rotary switch(R/S) is selected so that the contact(①) and the contact(③) thereof are connected. Thereafter, the color temperature of the strobe discharge tube(ST1) is maintained at 5500° K so that it is possible to photograph with pure white light.

Furthermore, the charging capacitance of the first control circuit(13) at the node(ⓑ) is determined by the compound capacitance of the series capacitors(C10,C11) and further series capacitors(C12,C13) that are connected in parallel therewith so that charging capacitance at the node(ⓑ) is double at the node(ⓐ). Consequently, it is possible to photograph in relatively higher key than the node(ⓐ) because the strobe discharge tube(ST1) is discharged with double capacitance.

Alternatively, the voltage applied to the anode terminal (Ad) of the strobe discharge tube(ST1) through the diode (D14a) is the same as the aforesaid fourfold retified DC voltage when the rotary switch is selected so that the contact(①) and the contact(④) thereof are connected. Consequently, since the color temperature of the strobe discharge tube(ST1) can be maintained at 5500° K, photographing with pure white light can be achived. Furthermore, as the charging capacitance of the first control circuit(13) at the node(ⓒ) is determined by the compound capacitance of the series capacitors(C10,C11), the series capacitors(C12, C13), and further series capacitors(C14,C15) that are connected in parallel with the aforesaid capacitors, the charging capacitance at the node(ⓒ) is increased threefold compared to the charging capacitance at the node(ⓐ) so that it is possible to photograph with relatively higher key than the node(ⓑ).

In another case, when the rotary switch(R/S) is selected so that the contact(①) and the contact(⑤) are connected, the applied voltage to the anode terminal(Ad) of the strobe discharge tube(ST1) is increased fourfold compared to the said fourfold rectified DC voltage. Thereafter, the charging capacitance at the node(ⓓ) of the first control circuit(13) is determined by the compound capacitance of the series capacitors(C10,C11;C12,C13;C14,C15) connected in parallel with each other and further series capacitors(C16,C17) that are connected in parallel with the said capacitors(C10, C11;C12,C13;C14,C15) so that charging capacitance at the node(ⓓ) increases fourfold compared to the charging capacitance at the node(ⓐ). Consequently, it is possible to photograph in relatively higher key than the node(ⓒ) because the strobe discharge tube(ST1) is discharged with fourfold capacitance. Furthermore the color temperature of the strobe discharge tube(ST1) is still maintained at 5500° K so that it is possible to photograph in pure white light.

The diodes(D11~D13) prevent reverse-voltage.

The second control circuit(13a) is operated in similar fashion to the first control circuit(13), and connected to the anode terminal (Ad) of the strobe discharge tube(ST2) through the diode(14b) and the digital display(DG2) which indicates the luminous intensity of the strobe discharge tube(ST2).

The co-operation of the first and the second control circuit(13,13a) will be described hereinafter.

The fourfold-voltage rectifier circuit(1) generates fourfold rectified DC voltage(when the input is 220 V, double rectified DC voltage is output from the double-voltage rectifier circuit(11) and then the said DC voltage is applied to the respective nodes(ⓐ,ⓐ') of the first and the second control circuits(13,13a) by connection of a connector(not shown). In this condition, the applied voltage to the anode terminals (Ad) of the respective strobe discharge tubes(ST1,ST2) is the same as the aforesaid fourfold rectified DC voltage when the rotary switches(R/S,R/S1) are respectively selected so that the contact(①) and the contact(②) thereof are connected. Therefore, the respective color temperatures of the strobe discharge tubes(ST1,ST2) are maintained at 5500° K so that it is possible to photograph with pure white light. The diodes(14a,14b) prevent reverse-voltage, and the digital display(DG1,DG2) displays the luminous intensity of the respective strobe discharge tubes (ST1, ST2)

Alternatively, the charging capacitance of the first and the second control circuits(13,13a) at the corresponding node(ⓐ,ⓐ') is determined by the compound capacitance of two series of capacitors(C10,C11;C10',C11') that are connected in series when the respective rotary switches(R/S,R/S1) are selected so that the contact(①) and the contact(②)are connected. This ensures that it is possible to photograph with desired tone because the respective strobe discharge tubes(ST1,ST2) are discharged with the charging capacitance determined as above.

Accordingly, it is possible to photograph in relative low key with pure white light, i.e., since the fourfold rectified DC voltage is applied to the anode terminal(Ad) of the strobe discharge tubes, it is possible to photograph in relative low key with pure white light by reducing the internal voltage of strobe discharge tubes. The internal voltage of the strobe discharge tube is reduced by controlling the charging capacitance thereof. This is a significant advantage of the invention compared with the conventional strobe dimmer. According to the conventional strobe dimmer, since it is necessary to apply relatively low voltage resulting in red lights it presents red color in the part of low key.

Alternatively, when the rotary switches(R/S,R/S1) are selected so that the contact(①) and the contact(③) thereof are connected, applied voltage to the anode terminals(Ad) of the strobe discharge tube(ST1,ST2) through the diode (D14a,14b) is the same as the aforesaid fourfold rectified DC voltage. Therefore, the color temperature of the strobe discharge tube(ST1,ST2) is maintained at 5500° K so that it is possible to photograph with pure white light. Furthermore, the charging capacities of the first and the second control circuits(13,13a) at the respective nodes(ⓑ,ⓑ') are determined by the compound capacitance of the corresponding series capacitors(C10,C11;C10',C11') and further series capacitors(C12,C13;C12',C13') that are connected in parallel therewith (C10,C11;C10'C11'). Consequently, as the charging capacitance at the node(ⓑ,ⓑ') is increased twofold at node(ⓐ,ⓐ'), it is possible to photograph in relatively higher key than the node(ⓐ,ⓐ') since the strobe discharge tube(ST1,ST2) is discharged with the said double charging capacitance.

In other words, as the fourfold rectified DC voltage is applied to the anode terminal(Ad) of the strobe discharge tube(ST1,ST2), it is possible to photograph with pure white light. Furthermore, owing to the double charging capacitance compared to at the node(ⓐ,ⓐ'), it is also possible to photograph in relatively higher key than the node(ⓐ,ⓐ').

Alternatively, when the rotary switches(R/S,R/S1) are selected so that the contact(①) and contact(④) thereof are connected, applied voltage to the anode terminal(Ad) of the strobe discharge tube(ST1,ST2) through the diode(D14a, D14b) is the same as the aforesaid fourfold rectified DC voltage. Therefore, the color temperature of the strobe discharge tube(ST1,ST2) is maintained at 5500° K so that it is possible to photograph with pure white light. Furthermore, the charging capacitance at the corresponding node(ⓒ,ⓒ') of the first and the second control circuits(13,13a) is determined by the compound capacitance of the series capacitors (C10,C11;C10',C11'), the series capacitors(C12,C13;C12',C13') and further series capacitors(C12,C13;C14',C15') that connected in parallel with both series capacitors respectively. Consequently, as the charging capacitance at the node (ⓒ,ⓒ') is increased threefold at the node(ⓐ,ⓐ'), it will be possible to photograph in relatively higher key than the node(ⓑ,ⓑ') because the strobe discharge tube(ST1,ST2) is discharged with the said threefold charging capacitance.

In other words, as the fourfold rectified DC voltage is applied to the anode terminal(Ad) of the strobe discharge tube(ST1,ST2), it is possible to photograph with pure white light. Furthermore, owing to the threefold charging capacitance compared to the capacitance at the node(ⓐ,ⓐ'), it is also possible to photograph in relatively higher key than at the node(ⓑ,ⓑ').

Alternatively, when the rotary switches(R/S,R/S1) are selected so that the contact(①) and the contact(⑤) thereof are connected, applied voltage to the anode terminal(Ad) of the strobe discharge tube(ST1,ST2) through the diode (D14a,D14b) is the same as the aforesaid fourfold rectified DC voltage. Therefore, the color temperature of the strobe discharge tube(ST1,ST2) is maintained at 5500° K so that it is possible to photograph with pure white light. Furthermore, the charging capacitance at the corresponding node(ⓓ,ⓓ') of the first and the second control circuits (13,13a) is determined by the compound capacitance of the series capacitors(C10,C11;C10'C11'), series capacitors(C12, C13;C12',C13'), series capacitors(C14,C15; C14'C15'), and further series capacitors(C16,C17;C16',C17'). The foregoing series capacitors are connected in parallel with each other. Consequently, as the charging capacitance at the node(ⓓ,ⓓ') increases fourfold compared to the charging capacitance at the node(ⓐ,ⓐ'), it will be possible to photograph in relatively higher key than at the node(ⓒ,ⓒ') because the strobe discharge tube(ST1,ST2) is discharged with the said fourfold charging capacitance.

In other words, as the fourfold rectified DC voltage is applied to the anode terminal(Ad) of the strobe discharge tube(ST1,ST2), it is possible to photograph with pure white light. Furthermore, owing to the fourfold charging capacitance compared to that of the node(ⓐ,ⓐ'), it is also possible to photograph in relatively higher key than at the node (ⓒ,ⓒ').

The diodes(D11~D13,D11'~D13') prevent reverse-voltage, and the respective digital displays(DG1,DG2) display the luminous intensity of the corresponding strobe discharge tubes (ST1,ST2).

According to another aspect of the invention, the strobe discharge tubes(ST1,ST2) may have an individual luminous intensity by different selection of the relay switches(R/S,R/S1), so that one of the strobe discharge tubes(ST1/ST2) may be used as a main light and the other as an auxiliary light.

In the case that fourfold rectified DC voltage generated from the fourfold-voltage rectifier circuit(1) is output(if input is 220 V, double rectified DC voltage is output from the double-voltage rectifier circuit(11), the DC voltage output is applied to the nodes(ⓐ,ⓐ') of the first and the second control circuits(13,13') by connection of connectors. In this case, when the first and the second control circuits (13,13') are connected to the anode(Ad) of the strobe discharge tube(ST3) through the corresponding diodes(15a,15b) by aforesaid co-operation of the first and the second control circuits(13,13a), the strobe discharge tube(ST3) may radiate with added luminous intensity, i.e., the sum of the respective luminous intensities of the first and second control circuits (13,13a). The diodes(15a,15b) prevent reverse-voltage, and the luminous intensity of the strobe discharge tube(ST3) is displayed in the digital display(DG3).

Operation of the color temperature control unit(14) will be described hereinafter with an embodiment of a non-coated lamp for the strobe discharge tube spaced apart from an object by a distance of 2 m and the first and the second control circuits(13,13a) are connected by connection of connectors, wherein the first and the second control circuits (13,13a) are respectively selected so that the contact(①)and the contact(②) are connected.

In the case that the contact(①) and the contact(②) of the rotary switch(R/S2) in the color temperature control unit(14) are connected, output from the fourfold-voltage rectifier circuit(1) is decreased by passage of voltage through a resistor, and then the decreased output of 300 V DC is applied to the anode terminal(Ad) of the strobe discharge tube(ST1,ST2). In this condition, as the entire circuit is operated by pressing the shutter of a camera, the color temperature of the strobe discharge tube(ST1,ST2) becomes 5400° K.

Alternatively, when the contact(①) and the contact(③) of the rotary switch(R/S2) are connected, 340 V DC is supplied to the anode terminal(Ad) of the strobe discharge tube(ST1,ST2) by passage of voltage through a resistor (R12), so that the color temperature of the strobe discharge tube(ST1,ST2) is adjusted to 5450° K.

In another aspect according to the invention, when the contact(①) and the contact(④) of the rotary switch(R/S2) are connected, 380 V DC is applied to the anode terminals (Ad) of the strobe discharge tube(ST1,ST2) by passage of voltage through a resistor(R13) so that the color temperature of the strobe discharge tube(ST1,ST2) is adjusted to 5500° K.

Alternatively, when the contact(①) and the contact(⑤) of the rotary switch(R/S2) are connected, 420 V DC is applied to the anode terminals(Ad) of the strobe discharge tube(ST1,ST2) by passage of voltage through a resistor (R14) so that the color temperature of the strobe discharge tube(ST1,ST2) is adjusted to 5550° K. Alternatively, when the contact(①) and the contact(⑥) of the rotary switch(R/S2) is connected, 460 V DC is applied to the anode terminal (Ad) of the strobe discharge tube(ST1,ST2) by passage of voltage through a resistor(R15) so that the color temperature of the strobe discharge tube(ST1,ST2) is adjusted to 5600° K.

Alternatively, when the contact(①) and the contact (⑦) of the rotary switch(R/S2) is connected, 500 V DC is applied to the anode terminal(Ad) of the strobe discharge tube(ST1, ST2) by passage of voltage through a resistor(R16) so that the color temperature of the strobe discharge tube(ST1,ST2) is adjusted to 5650° K. Alternatively, when the contact(①) and the contact(⑧) of the rotary switch(R/S2) is connected, 540 V DC is applied to the anode terminal(Ad) of the strobe discharge tube(ST1,ST2) by passage of voltage through a resistor(R17) so that the color temperature of the strobe discharge tube(ST1,ST2) is adjusted to 5700° K. Alternatively, when the contact(①) and the contact(⑨) of the rotary switch(R/S2) is connected, 580 V DC is applied to the anode terminal(Ad) of the strobe discharge tube(ST1, ST2) by passage voltage through a resistor(R18) so that the color temperature of the strobe discharge tube(ST1,ST2) is adjusted to 5750° K. Alternatively, when the contact(①) and the contact(⑩) of the rotary switch(R/S2) is connected, 620 V DC is applied to the anode terminal(Ad) of the strobe discharge tube(ST1,ST2) by passage of voltage through a resistor(R19) so that the color temperature of the strobe discharge tube(ST1,ST2) is adjusted to 5800° K.

Another aspect of the present invention related with cooperation of the said first and second control circuits(13, 13a) and the color control unit(14) is described with reference to Table 1. Since the specific operation of each circuit is described above, the results according to the various conditions will be described below.

In the case that a 600 W strobe discharge tube according to the present invention is arranged at a distance of 2 m from an object and a non-coated lamp is used, the color temperature is 5400° K and the iris diaphragm is set to 8.0 when the contact(①) and the contact(②) of the rotary switches(R/S,R/S1) are connected while the contact(①) and the contact(②) of the rotary switch(R/S2) are connected. Alternatively, when the contact(①) and the contact(③) of the rotary switches(R/S,R/S1) are connected, the iris diaphragm becomes 11 while the color temperature is maintained at 5400° K. Alternatively, when the contact(①) and the contact(④) of the rotary switches(R/S,R/S1) are connected, the iris diaphragm becomes 11.5 while the color temperature is maintained at 5400° K. Furthermore, when the contact(①) and the contact(⑤) of the rotary switches (R/S,R/S1) are connected, the iris diaphragm becomes 16 while the color temperature is maintained at 5400° K.

In the case that the contact(①) and the contact(③) of the rotary switch(R/S2) are connected, the color temperature becomes 5450° K while the iris diaphragm becomes 8.5 when the contact(①) and the contact(②) of the respective rotary switches(R/S,R/S1) are connected. Alternatively, when the contact(①) and the contact(③) of the respective rotary switches(R/S,R/S1) are connected, the iris diaphragm becomes 11.3 while the color temperature is maintained at 5450° K. Alternatively, when the contact(①) and the contact(④) of the rotary switches(R/S,R/S1) are connected, the iris diaphragm becomes 11.8 while the color temperature is maintained at 5450° K. Furthermore, when the contact(①) and the contact(⑤) of the rotary switches(R/S,R/S1) are connected, the iris diaphragm becomes 16.3 while the color temperature is maintained at 5450° K.

In the case that the contact(①) and the contact(④) of the rotary switch(R/S2) are connected, when the contact(①)

and the contact(②) of the rotary switches(R/S,R/S1) are connected, the color temperature becomes 5500° K while the iris diaphragm becomes 11. Alternatively, when the contact(①) and the contact(③) of the rotary switches(R/S,R/S1) are connected, the iris diaphragm becomes 11.5 while the color temperature is maintained at 5500° K. Alternatively, when the contact(①) and the contact(④) of the rotary switches(R/S,R/S1) are connected, the iris diaphragm becomes 16 while the color temperature is maintained at 5500° K. Furthermore, when the contact(①) and the contact(⑤)of the rotary switches(R/S,R/S1) are connected, the iris diaphragm becomes 16.5 while the color temperature is maintained at 5500° K.

In the case that the contact(①) and the contact(⑤) of the rotary switch(R/S2) are connected, when the contact(①) and the contact(②) of the rotary switches(R/S,R/S1) are connected, the color temperature becomes 5550° K while the iris diaphragm becomes 11.3. Alternatively, when the contact(①) and the contact(③) of the rotary switches(R/S,R/S1) are connected, the iris diaphragm becomes 11.8 while the color temperature is maintained at 5550° K. Alternatively, when the contact(①) and the contact(④) of the rotary switches(R/S,R/S1) are connected, the iris diaphragm becomes 16.3 while the color temperature is maintained at 5550° K. Furthermore, when the contact(①) and the contact(⑤) of the rotary switches(R/S,R/S1) are connected, the iris diaphragm becomes 16.8 while the color temperature is maintained at 5550° K.

In the case that the contact(①) and the contact(⑥) of the rotary switch(R/S2) are connected, the color temperature becomes 5600° K while the iris diaphragm becomes 11.5 when the contact(①) and the contact(②) of the rotary switches(R/S,R/S1) are connected. Alternatively, when the contact(①) and the contact(③) of the rotary switches(R/S,R/S1) are connected, the iris diaphragm becomes 16 while the color temperature is maintained at 5600° K. Alternatively, when the contact(①) and the contact(④) of the rotary switches(R/S,R/S1) are connected, the iris diaphragm becomes 16.5 while the color temperature is maintained at 5600° K. Furthermore, when the contact(①) and the contact(⑤) of the rotary switches(R/S,R/S1) are connected, the iris diaphragm becomes 22 while the color temperature is maintained at 5600° K.

In the case that contact(①) and the contact(⑦) of the rotary switch(R/S2) are connected, the color temperature becomes 5650° K while the iris diaphragm becomes 11.8 when the contact(①) and the contact(②) of the rotary switches(R/S,R/S1) are connected. Alternatively, when the contact(①) and the contact(③) of the rotary switches(R/S,R/S1) are connected, the iris diaphragm becomes 16.3 while the color temperature is maintained at 5650° K. Alternatively, when the contact(①) and the contact(④) of the rotary switches(R/S,R/S1) are connected, the iris diaphragm becomes 16.8 while the color temperature is maintained at 5650° K. Furthermore, when the contact(①) and the contact(⑤) of the rotary switches(R/S,R/S1) are connected, the iris diaphragm becomes 22.3 while the color temperature is maintained at 5650° K.

In the case that the contact(①) and the contact(⑧) of the rotary switch(R/S2) are connected, the color temperature becomes 5700° K while the iris diaphragm becomes 16 when the contact(①) and the contact(②) of the rotary switches(R/S,R/S1) are connected. Alternatively, when the contact(①) and the contact(③) of the rotary switches(R/S,R/S1) are connected, the iris diaphragm becomes 16.5 while the color temperature is maintained at 5700° K. Alternatively, when the contact(①) and the contact(④) of the rotary switches(R/S,R/S1) are connected, the iris diaphragm becomes 22 whiled the color temperature is maintained at 5700° K. Furthermore, when the contact(①) and the contact(⑤) of the rotary switches(R/S,R/S1) are connected, the iris diaphragm becomes 22.5 while the color temperature is maintained at 5700° K.

In the case that the contact(①) and the contact(⑨) of the rotary switch(R/S2) are connected, the color temperature becomes 5750° K while the iris diaphragm becomes 16.3 when the contact(①) and the contact(②) of the rotary switches(R/S,R/S1) are connected. Alternatively, when the contact(①) and the contact(③) of the rotary switches(R/S,R/S1) are connected, the iris diaphragm becomes 16.8 while the color temperature is maintained at 5750° K. Alternatively, when the contact(①) and the contact(④) of the rotary switches(R/S,R/S1) are connected, the iris diaphragm becomes 22.3 while the color temperature is maintained at 5750° K. Furthermore, when the contact(①) and the contact(⑤) of the rotary switches(R/S,R/S1) are connected, the iris diaphragm becomes 22.8 while the color temperature is maintained at 5750° K.

In the case that the contact(①) and the contact(⑩) of the rotary switch(R/S2) are connected, the color temperature becomes 5800° K while the iris diaphragm becomes 16.5 when the contact(①) and the contact(②) of the rotary switches(R/S,R/S1) are connected. Alternatively, when the contact(①) and the contact(③) of the rotary switches(R/S,R/S1) are connected, the iris diaphragm becomes 22 while the color temperature is maintained at 5800° K. Alternatively, when the contact(①) and the contact(④) of the rotary switches(R/S,R/S1) are connected, the iris diaphragm becomes 22.5 while the color temperature is maintained at 5800° K. Furthermore, when the contact(①) and the contact(⑤) of the rotary switches(R/S,R/S1) are connected, the iris diaphragm becomes 22.5 while the color temperature is maintained at 5800° K.

According to the present invention, it is possible to control the luminous intensity and the color temperature required for photographing accurately. This is achieved by the luminous intensity control circuit(13) and the color temperature control unit(14).

As shown in Tables 2 and 3, it is obvious that a gold coated(No.3,No.4) xenon lamp, radiating at 5400° K or 5600° K, can be used instead of the aforesaid non-coated xenon lamp of which the color temperature is 5800° K at a charging voltage of 620 V DC.

TABLE 1

| | R/S,R/S1 | | | | DC charge voltage | |
|---|---|---|---|---|---|---|
| R/S2 | ①-② | ①-③ | ①-④ | ①-⑤ | age | |
| ①-② | 5400° K. /8.0 | 5400° K. /11 | 5400° K. /11.5 | 5400° K. /16 | 300V | AC 110/ 220 |
| ①-③ | 5450° K. /8.5 | 5450° K. /11.3 | 5450° K. /11.8 | 5450° K. /16.3 | 340V | AC 110/ 220 |
| ①-④ | 5500° K. /11 | 5500° K. /11.5 | 5500° K. /16 | 5500° K. /16.5 | 380V | AC 110/ 220 |
| ①-⑤ | 5550° K. /11.3 | 5550° K. /11.8 | 5550° K. /16.3 | 5550° K. /16.8 | 420V | AC 110/ 220 |
| ①-⑥ | 5600° K. /11.5 | 5600° K. /16 | 5600° K. /16.5 | 5600° K. /22 | 460V | AC 110/ 220 |

TABLE 1-continued

| R/S2 | R/S,R/S1 ①-② | ①-③ | ①-④ | ①-⑤ | DC charge voltage | |
|---|---|---|---|---|---|---|
| ①-⑦ | 5650° K. /11.8 | 5650° K. /16.3 | 5650° K. /16.8 | 5650° K. /22.3 | 500V | AC 110/220 |
| ①-⑧ | 5700° K. /16 | 5700° K. /16.5 | 5700° K. /22 | 5700° K. /22.5 | 540V | AC 110/220 |
| ①-⑨ | 5750° K. /16.3 | 5750° K. /16.8 | 5750° K. /22.3 | 5750° K. /22.8 | 580V | AC 110/220 |
| ①-⑩ | 5800° K. /16.5 | 5800° K. /22 | 5800° K. /22.5 | 5800° K. /32 | 620V | AC 110/220 |

*In the case of using the non-coated xenon lamp Color Temperature/Iris Diaphragm Values for Various Switch Configurations

TABLE 2

| R/S2 | R/S,R/S1 ①-② | ①-③ | ①-④ | ①-⑤ | DC charge voltage | |
|---|---|---|---|---|---|---|
| ①-② | 5200° K. /8.0 | 5200° K. /11 | 5200° K. /11.5 | 5200° K. /16 | 300V | AC 110/220 |
| ①-③ | 5250° K. /8.5 | 5250° K. /11.3 | 5250° K. /11.8 | 5250° K. /16.3 | 340V | AC 110/220 |
| ①-④ | 5300° K. /11 | 5300° K. /11.5 | 5300° K. /16 | 5300° K. /16.5 | 380V | AC 110/220 |
| ①-⑤ | 5350° K. /11.3 | 5350° K. /11.8 | 5350° K. /16.3 | 5350° K. /16.8 | 420V | AC 110/220 |
| ①-⑥ | 5400° K. /11.5 | 5400° K. /16 | 5400° K. /16.5 | 5400° K. /22 | 460V | AC 110/220 |
| ①-⑦ | 5450° K. /11.8 | 5450° K. /16.3 | 5450° K. /16.8 | 5450° K. /22.3 | 500V | AC 110/220 |
| ①-⑧ | 5500° K. /16 | 5500° K. /16.5 | 5500° K. /22 | 5500° K. /22.5 | 540V | AC 110/220 |
| ①-⑨ | 5550° K. /16.3 | 5550° K. /16.8 | 5550° K. /22.3 | 5550° K. /22.8 | 580V | AC 110/220 |
| ①-⑩ | 5600° K. /16.5 | 5600° K. /22 | 5600° K. /22.5 | 5600° K. /32 | 620V | AC 110/220 |

*In the case of using the gold-coated No. 3 xenon lamp Color Temperature/Iris Diaphragm Values for Various Switch Configurations

TABLE 3

| R/S2 | R/S,R/S1 ①-② | ①-③ | ①-④ | ①-⑤ | DC charge voltage | |
|---|---|---|---|---|---|---|
| ①-② | 5000° K. /8.0 | 5000° K. /11 | 5000° K. /11.5 | 5000° K. /16 | 300V | AC 110/220 |
| ①-③ | 5050° K. /8.5 | 5050° K. /11.3 | 5050° K. /11.8 | 5050° K. /16.3 | 340V | AC 110/220 |
| ①-④ | 5100° K. /11 | 5100° K. /11.5 | 5100° K. /16 | 5100° K. /16.5 | 380V | AC 110/220 |
| ①-⑤ | 5150° K. /11.3 | 5150° K. /11.8 | 5150° K. /16.3 | 5150° K. /16.8 | 420V | AC 110/220 |
| ①-⑥ | 5200° K. /11.5 | 5200° K. /16 | 5200° K. /16.5 | 5200° K. /22 | 460V | AC 110/220 |
| ①-⑦ | 5250° K. /11.8 | 5250° K. /16.3 | 5250° K. /16.8 | 5250° K. /22.3 | 500V | AC 110/220 |
| ①-⑧ | 5300° K. /16 | 5300° K. /16.5 | 5300° K. /22 | 5300° K. /22.5 | 540V | AC 110/220 |
| ①-⑨ | 5350° K. /16.3 | 5350° K. /16.8 | 5350° K. /22.3 | 5350° K. /22.8 | 580V | AC 110/220 |
| ①-⑩ | 5400° K. /16.5 | 5400° K. /22 | 5400° K. /22.5 | 5400° K. /32 | 620V | AC 110/220 |

*In the case of using the gold-coated No. 4 xenon lamp Color Temperature/Iris Diaphragm Values for Various Switch Configurations The modeling lamp unit(16) having modeling lamps(M1, M2,M3) will be described hereinafter.

The modeling lamps(M1,M2,M3) are respectively connected to the cathodes(Cd) of the respective strobe discharge tubes(ST1,ST2,ST3) through respective contacts(②, ③, ④, ⑤) of the rotary switches(R/Sa,R/Sb,R/Sc), and respectively connected to the output terminal(OUT) of the dimmer (15) through the contact(①) of the respective rotary switches (R/Sa,R/Sb,R/Sc). When 110 V AC is applied to the dimmer(15) as the input power source, the rotary switch terminal(a) and the terminal(b), and the terminal(d) and the terminal(e) are respectively connected to provide 110 V AC to the output terminal. Alternatively, when 220 V AC is applied, the terminal(b) and the terminal(c), and the terminal (e) and the terminal (f) are respectively connected to provide 110 V AC to the output terminal through a ½dimmer. Accordingly, the output of the dimmer(15') is constant at 110 V AC, wherein the output terminal is connected to the respective contacts(①) of the rotary switches(R/Sa,R/Sb, R/Sc).

As stated above, since one end of each modeling lamp is connected to the cathode terminal (Cd) of the corresponding strobe discharge tube(ST1,ST2,ST3) and the other end is connected to the output terminal of the dimmer through the corresponding rotary switch(R/Sa,R/Sb,R/Sc), the user can see the intensity of illumination prior to discharge of the respective strobe discharge tubes(ST1,ST2,ST3), i.e., prior to taking a photo.

Finally, the present invention provides a strobe dimmer that ensures optimal photographing conditions with a desired color temperature and exposure(the iris diaphragm) in accordance with an object and/or its surroundings.

The aforesaid embodiments are not aims to limit the present invention but to understand. It will be considered that various modifications and variations within the spirits and principles are pertained to the present invention.

I claim:

1. A strobe dimmer of which the luminous intensity and color temperature are respectively controllable comprising:
    a fourfold-voltage rectifier circuit having two twofold-voltage rectifier circuits for rectifying an input voltage to twofold or fourfold DC voltage depending on the magnitude of the input voltage and applying the rectified input voltage to respective strobe discharge tubes (ST1,ST2,ST3);

a high voltage generating circuit for supplying high voltage to respective trigger terminals of the strobe discharge tubes (ST1,ST2,ST3) through corresponding trigger coils;

a first luminous intensity control circuit connected between a ground terminal and an output terminal of the fourfold rectifier circuit, and connected to respective anode terminals of the strobe discharge tubes (ST1,ST3);

a second luminous intensity control circuit connected between the ground terminal and the output terminal of the fourfold rectifier circuit, and connected to respective anode terminals of the strobe discharge tubes (ST2,ST3); and a color temperature control unit having a connection to a terminal of a power supply.

2. The strobe dimmer of claim 1, wherein said first luminous intensity control circuit includes first capacitors (C10,C11) connected in a first series arrangement between the output terminal and the ground terminal of the fourfold-voltage rectifier circuit; a plurality of groups of further series connected capacitors (C12,C13;C14,C15;C16,C17) respectively connected in parallel to said first capacitors (C10, C11); diodes (D11,D12,D13) respectively connected between corresponding nodes (a,b;b,c;c,d); and a rotary switch having contacts (2,3,4,5) respectively connected with the corresponding nodes (a,b,c,d), and a contact (1) connected to the anode terminals of the strobe discharge tubes (ST1,ST2) through respective digital displays DG1,DG2).

3. The strobe dimmer of claim 1, wherein said second luminous intensity control circuit includes second capacitors (C10',C11') connected in a second series arrangement between the output terminal and the ground terminal of the fourfold-voltage rectifier circuit; a plurality of groups of further series connected capacitors (C12',C13';C14',C15'; C16',C17') respectively connected in parallel to said second capacitors (C10',C11'); diodes (D11',D12',D13') respectively connected between corresponding nodes (a',b';b'c';c',d'); and a rotary switch having contacts (2,3,4,5,) respectively connected with the corresponding nodes (a',b',c',d'), and a contact (1) connected to the anode terminals of the strobe discharge tubes (ST2,ST3) through respective digital displays (DG2,DG3).

4. The strobe dimmer of claim 1, wherein said color temperature control unit includes a rotary switch having contacts (2,3,4,5,6,7,8,9,10) respectively connected to an end of corresponding resistors (R11,R12,R13,R14,R15,R16, R17,R18,R19) and said contacts (2,3,4,5,6,7,8,9,10) connected to the terminal of a power supply though a digital display (DG4), and a contact (1) connected to a ground terminal through a relay, a resistor, and a diode.

5. The strobe dimmer of claim 1, 2, 3, or 4, further comprising a modeling lamp unit indicating the intensity of the illumination of the strobe discharge tubes (ST1,ST2, ST3) prior to taking a photo.

6. The strobe dimmer of claim 5, wherein said modeling lamp unit includes modeling lamps (M1,M2,M3) having an end connected to a cathode of strobe discharge tubes (ST1, ST2,ST3) respectively, and rotary switches(R/Sa,R/Sb,R/ Sc) having a contact (1) connected to the output terminal of a dimmer, and contacts (2,3,4,5) connected to another end of said modeling lamps (M1,M2,M3).

* * * * *